US011296762B2

(12) United States Patent
Sartori et al.

(10) Patent No.: US 11,296,762 B2
(45) Date of Patent: Apr. 5, 2022

(54) METHOD AND APPARATUS FOR PROVIDING USER EQUIPMENT ACCESS TO MILLIMETER WAVE STATIONS THROUGH A MICROWAVE STATION

(71) Applicant: Futurewei Technologies, Inc., Plano, TX (US)

(72) Inventors: Philippe Sartori, Algonquin, IL (US); Vipul Desai, Palatine, IL (US); George Calcev, Hoffman Estates, IL (US); Anthony C. K. Soong, Plano, TX (US); Jialing Liu, Palatine, IL (US); Qian Cheng, Naperville, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/949,850

(22) Filed: Apr. 10, 2018

(65) Prior Publication Data

US 2018/0234150 A1 Aug. 16, 2018

Related U.S. Application Data

(63) Continuation of application No. 14/883,427, filed on Oct. 14, 2015, now abandoned.

(51) Int. Cl.
*H04B 7/06* (2006.01)
*H04W 36/30* (2009.01)
(Continued)

(52) U.S. Cl.
CPC .......... *H04B 7/0617* (2013.01); *H04B 7/063* (2013.01); *H04B 7/0626* (2013.01);
(Continued)

(58) Field of Classification Search
CPC .... H04B 7/0617; H04B 7/0626; H04B 7/063; H04B 7/0695; H04W 16/28;
(Continued)

(56) References Cited

U.S. PATENT DOCUMENTS 9,362,994 B2 7/2016 Seol et al.
2011/0182174 A1 7/2011 Pi et al.
(Continued)

FOREIGN PATENT DOCUMENTS

CN 101873156 A 10/2010
CN 102685611 A 9/2012
(Continued)

OTHER PUBLICATIONS

Miao et al., "Dynamic Millimeter WA VE Pencil Cell Management in the Support of Multi-Connectivity and Mobility", Jul. 29, 2015, U.S. Appl. No. 62/198,247, pp. 1-39 (Year: 2015).*
(Continued)

*Primary Examiner* — Shah M Rahman
(74) *Attorney, Agent, or Firm* — Slater Matsil, LLP

(57) ABSTRACT

A method for providing user equipment access to millimeter wave stations through a microwave station includes receiving an indication of millimeter wave stations operating within a microwave coverage area of a microwave station. In a microwave band, information associated with the millimeter wave stations is broadcasted to user equipment in the microwave coverage area. A request is sent to the millimeter wave stations to transmit configuration signals over a microwave band. An instruction is transmitted over the microwave band to the user equipment to perform proximity measurements of the configuration signals. According to the proximity measurements, a request is sent to a particular millimeter wave station to transmit beamforming signals over a millimeter wave band. An instruction is transmitted over the
(Continued)

microwave band to the user equipment to perform beamforming measurements of the beamforming signals. According to the beamforming measurements, the user equipment is switched to millimeter wave operation.

18 Claims, 11 Drawing Sheets

(51) Int. Cl.
| | |
|---|---|
| H04W 64/00 | (2009.01) |
| H04W 36/00 | (2009.01) |
| H04W 36/14 | (2009.01) |
| H04W 16/28 | (2009.01) |

(52) U.S. Cl.
CPC .......... *H04B 7/0695* (2013.01); *H04W 36/30* (2013.01); *H04W 64/00* (2013.01); *H04W 16/28* (2013.01); *H04W 36/0058* (2018.08); *H04W 36/14* (2013.01)

(58) Field of Classification Search
CPC . H04W 36/0058; H04W 36/14; H04W 36/30; H04W 64/00
See application file for complete search history.

(56) References Cited

U.S. PATENT DOCUMENTS

| | | | |
|---|---|---|---|
| 2012/0177373 A1 | 7/2012 | Choi et al. | |
| 2013/0088983 A1* | 4/2013 | Pragada | H04W 36/0058 370/252 |
| 2013/0281076 A1* | 10/2013 | Damnjanovic | H04W 8/22 455/418 |
| 2014/0162655 A1 | 6/2014 | Hong et al. | |
| 2014/0334564 A1* | 11/2014 | Singh | H04B 7/0456 375/267 |
| 2015/0004918 A1 | 1/2015 | Wang et al. | |
| 2015/0092676 A1 | 4/2015 | Periyalwar et al. | |
| 2015/0173080 A1 | 6/2015 | Kimura et al. | |
| 2015/0201368 A1 | 7/2015 | Cudak et al. | |
| 2015/0264699 A1* | 9/2015 | Fwu | H04L 5/003 370/329 |
| 2015/0319748 A1 | 11/2015 | Huang | |
| 2015/0351135 A1 | 12/2015 | Schmidt et al. | |
| 2015/0382258 A1* | 12/2015 | Schmidt | H04W 52/0229 455/440 |
| 2016/0050601 A1* | 2/2016 | Jeong | H04W 28/08 455/436 |
| 2016/0056904 A1* | 2/2016 | Sakaguchi | H04W 72/085 370/252 |
| 2016/0100347 A1 | 4/2016 | Ryu et al. | |
| 2016/0165605 A1 | 6/2016 | Dimou et al. | |
| 2016/0316375 A1 | 10/2016 | Li | |
| 2016/0330643 A1* | 11/2016 | Sahin | H04B 7/088 |
| 2017/0054479 A1* | 2/2017 | Sang | C07D 413/10 |
| 2017/0093693 A1* | 3/2017 | Barzegar | H01Q 1/2291 |
| 2017/0142751 A1* | 5/2017 | Liu | H04L 5/0092 |
| 2017/0171867 A1 | 6/2017 | Garcia et al. | |
| 2017/0325244 A1* | 11/2017 | Zhang | H04W 24/10 |
| 2017/0347277 A1* | 11/2017 | Zhang | H04W 16/32 |
| 2018/0139014 A1* | 5/2018 | Xiong | H04L 1/18 |
| 2018/0205577 A1* | 7/2018 | Shin | H04B 17/24 |
| 2018/0220308 A1* | 8/2018 | Miao | H04W 16/28 |
| 2018/0220338 A1* | 8/2018 | Tabe | H04W 36/0027 |
| 2018/0227828 A1* | 8/2018 | Sirotkin | H04W 48/02 |
| 2018/0241454 A1* | 8/2018 | Lee | H04B 7/06 |
| 2018/0294859 A1* | 10/2018 | Niu | H04J 11/00 |
| 2020/0221429 A1* | 7/2020 | Li | H04L 5/0053 |

FOREIGN PATENT DOCUMENTS

| | | |
|---|---|---|
| CN | 103891336 A | 6/2014 |
| CN | 103945537 A | 7/2014 |
| CN | 104285457 A | 1/2015 |
| CN | 104301967 A | 1/2015 |
| CN | 104303477 A | 1/2015 |
| CN | 104335639 A | 2/2015 |
| CN | 104604300 A | 5/2015 |
| CN | 104813713 A | 7/2015 |
| CN | 104936165 A | 9/2015 |
| WO | 2013086164 A1 | 6/2013 |
| WO | 2014036059 A1 | 3/2014 |

OTHER PUBLICATIONS

Sirotkin et al., "Scanning Optimization in SGHZ for LTE/WLAN Aggregation (LWA) Enabled Ues", Jul. 23, 2015, U.S. Appl. No. 62/196,181, pp. 1-12 (Year: 2015).*
ETSI, "ETSI TS 136 213 V12.6.0 LTE; Evolved Universal Terrestrial Radio Access (E-UTRA) Physical layer procedures", Sep. 2015, 3GPP TS 36..213 version 12.6.0 Release 12, pp. 1-241 (Year: 2015).*
ETSI, "Evolved Universal Terrestrial Radio Access (E-UTRA); Physical layer procedures (3GPP TS 36.213 version 12.6.0 Release 12)", Sep. 2015, 3GPP, ETSI TS 136 213 V12.6.0, p. 102, Total p. 1 (Year: 2015).*
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V13.1.0 (Sep. 2015), Sep. 2015, 254 pages.
Nitsche, et al., "IEEE 802.11ad: directional 60 GHz communication for multi-Gigabit-per-second Wi-Fi," Radio Cummunications, IEEE Communications Magazine, Dec. 1, 2014, 10 pages.
"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)", 3GPP TS 36.305 V9.8.0, Technical Specification, Sep. 2011, 51 Pages.

* cited by examiner

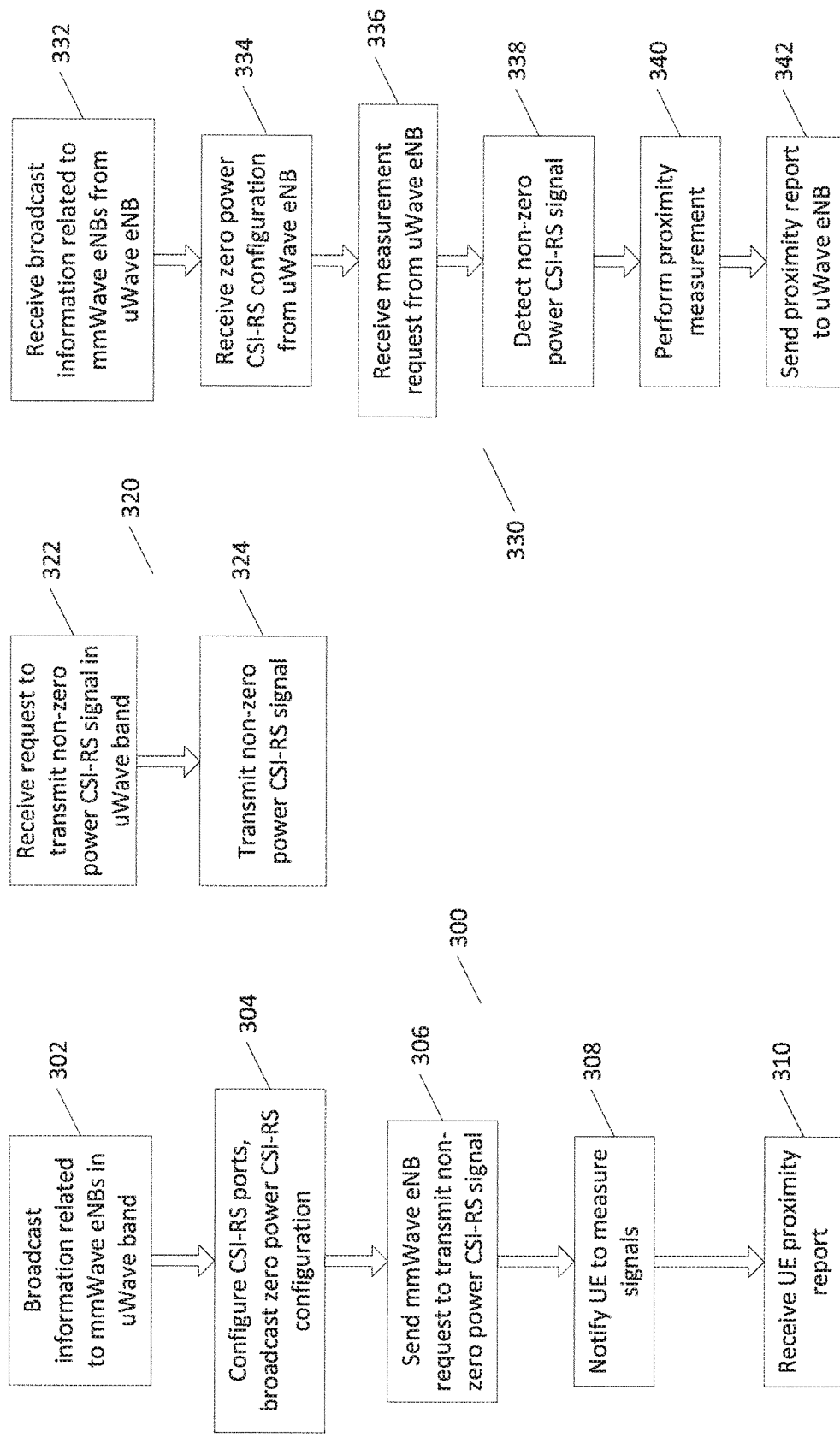

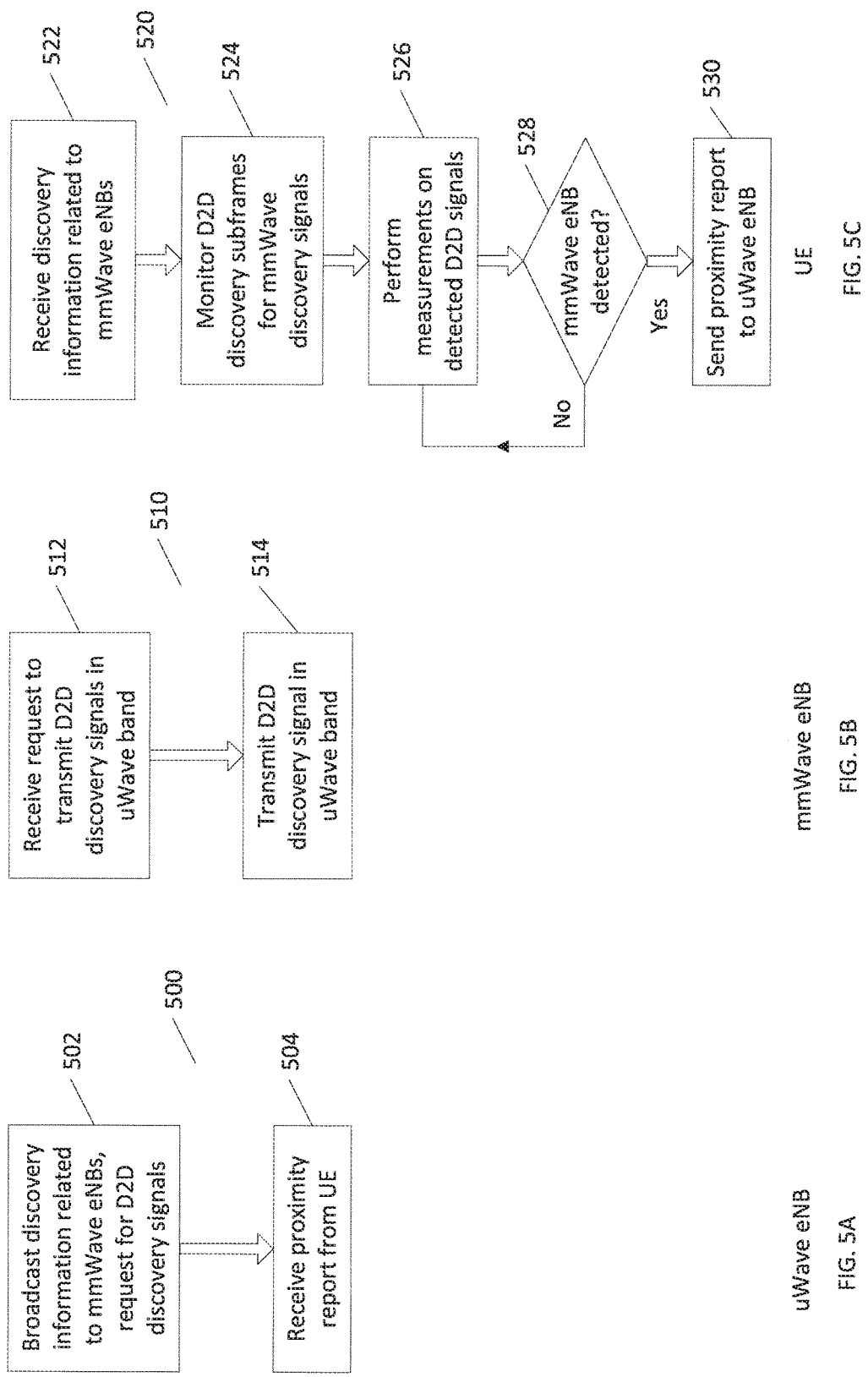

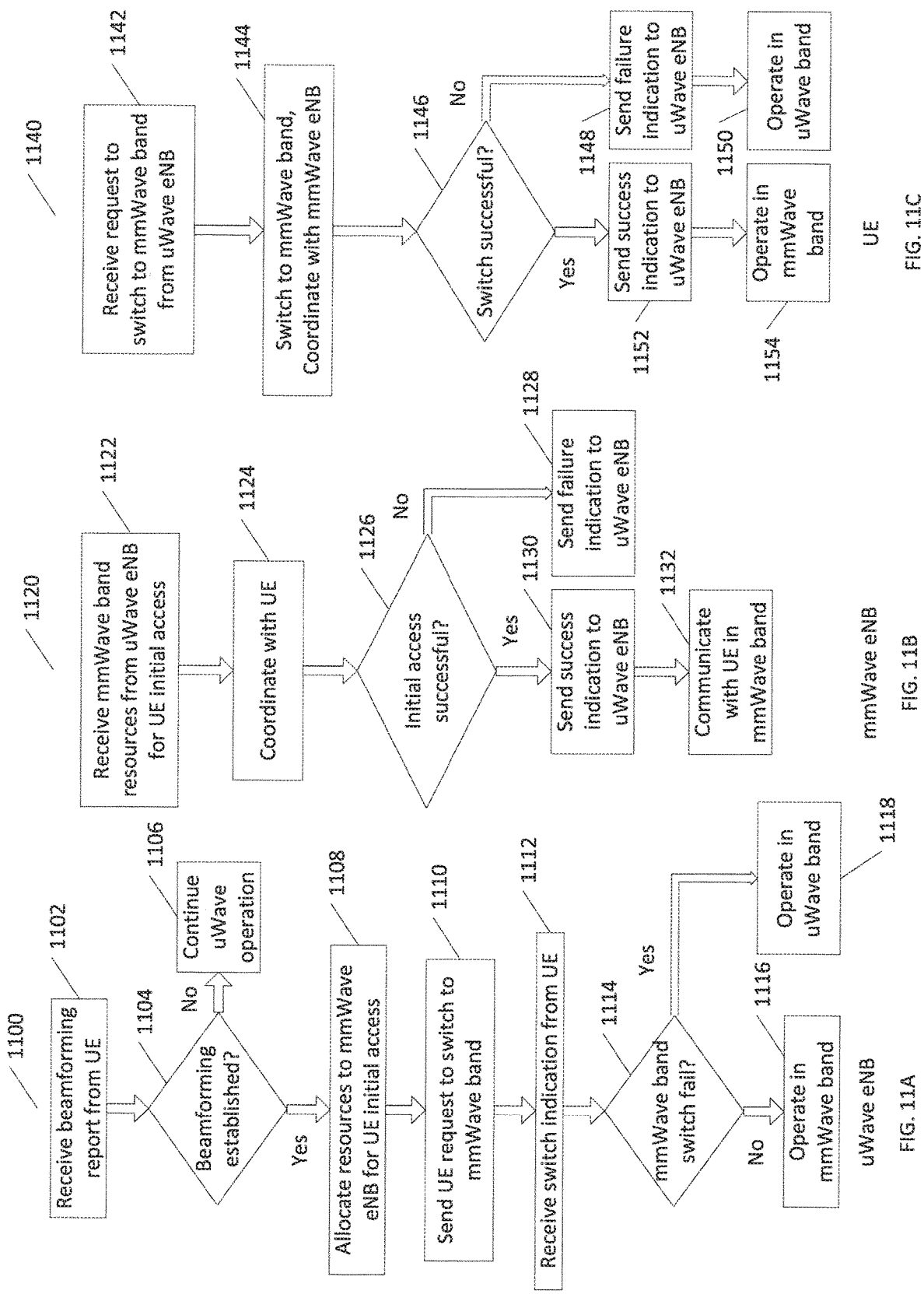

METHOD AND APPARATUS FOR PROVIDING USER EQUIPMENT ACCESS TO MILLIMETER WAVE STATIONS THROUGH A MICROWAVE STATION

CROSS-REFERENCE TO RELATED APPLICATIONS

This application is continuation of U.S. patent application Ser. No. 14/883,427, filed on Oct. 14, 2015, which application is hereby incorporated herein by reference.

TECHNICAL FIELD

The present disclosure relates in general to cellular communication systems and more particularly to a method and apparatus for providing user equipment access to millimeter wave stations through a microwave station.

BACKGROUND

The amount of wireless data is growing at an unprecedented rate in the last few years, pushing the capacity of current macro cellular deployments. Cellular communications systems, which utilize microwave (uWave) spectrum bands (300 MHz to 3 GHz), are becoming capacity limited due to interference and traffic load. The use of high frequency bands, where vast amounts of bandwidth are available, is considered to be a crucial element for future generation communication systems. The use of millimeter wave (mmWave) frequency bands (e.g., 28, 38, 60, and 73 GHz) can mitigate the problem of capacity currently observed in microwave systems. Propagation in the mmWave band is more challenging than in the uWave band, resulting in a more stringent link budget at mmWave bands than at uWave bands. This can be somewhat compensated by using beamforming. In order to achieve significant beamforming gain, channel knowledge at the transmitter is needed. However, when a user equipment (UE) wants to perform initial access in the mmWave band, such channel information is not available since the UE has not yet exchanged information with the mmWave eNodeB (eNB) base transceiver station. This would unacceptably limit the range on the mmWave eNB.

SUMMARY

From the foregoing, it may be appreciated by those skilled in the art that a need has arisen for a technique to establish access to millimeter wave operation for user equipment operating in a microwave band. In accordance with the present disclosure, a method and apparatus for providing user equipment access to millimeter wave stations through a microwave station are provided that greatly reduce or substantially eliminate problems and disadvantages associated with current microwave operating techniques.

A method for providing user equipment access to millimeter wave stations through a microwave station includes receiving an indication of millimeter wave stations operating within a microwave coverage area of a microwave station. In a microwave band, information associated with the millimeter wave stations is broadcasted to user equipment in the microwave coverage area. A request is sent to the millimeter wave stations to transmit configuration signals over a microwave band. An instruction is transmitted over the microwave band to the user equipment to perform proximity measurements of the configuration signals. According to the proximity measurements, a request is sent to a particular millimeter wave station to transmit beamforming signals over a millimeter wave band. An instruction is transmitted over the microwave band to the user equipment to perform beamforming measurements of the beamforming signals. According to the beamforming measurements, the user equipment is switched to millimeter wave operation.

The present disclosure describes many technical advantages over conventional microwave telecommunication operating systems. For example, one technical advantage is to utilize a microwave station in coordinating user equipment operation in a millimeter wave band. Another technical advantage is to provide an access interface between a millimeter wave station and user equipment in determining whether the user equipment can switch to millimeter wave operation. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIGS. 3A-3C illustrate methods performed by a uWave eNodeB station, a mmWave eNodeB station, and user equipment in performing potential proximity establishment;

FIGS. 5A-5C illustrate device to device methods performed by the uWave eNodeB station, the mmWave eNodeB station, and user equipment in performing potential proximity establishment;

FIGS. 11A-11C illustrate methods performed by the uWave eNodeB station, the mmWave eNodeB station, and user equipment in switching the user equipment from uWave band operation to mmWave band operation;

DETAILED DESCRIPTION OF ILLUSTRATIVE EMBODIMENTS

FIGS. 1 through 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

Figure 1:
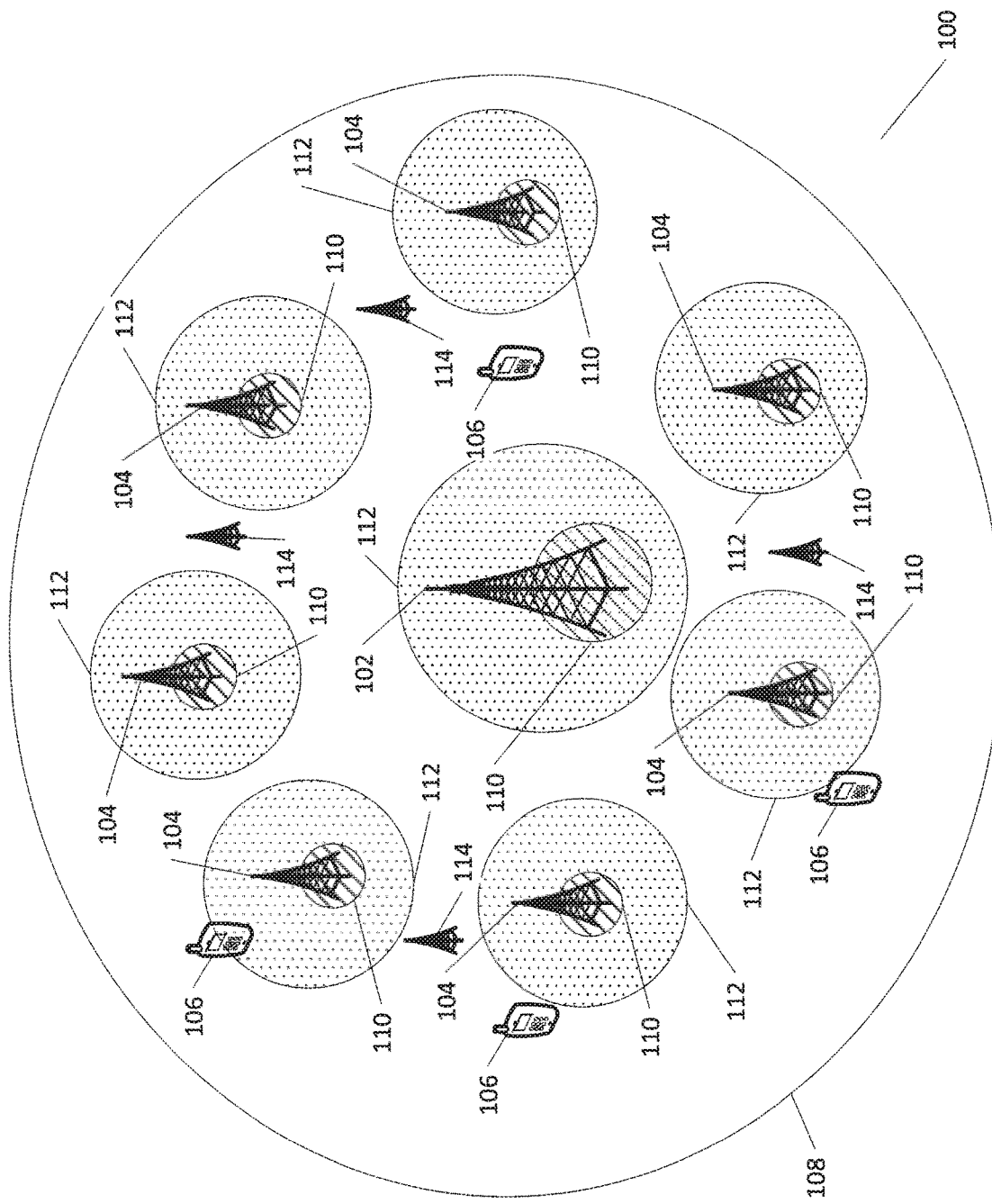
FIG. 1 illustrates an example network deploying both mmWave and uWave stations.

FIG. 1 shows an example network 100 deploying both mmWave and uWave carriers. Network 100 includes one or more uWave eNB stations 102, mmWave eNB stations 104, and User Equipment 106. uWave eNB station 102 provides a microwave coverage area 108. Each mmWave eNB station has a local coverage area 110 and a desired coverage area 112 established according to the methods discussed below. UE 106 communicates with uWave eNB station 102 using microwave transmission signals and, upon obtaining access, communicates with mmWave eNB stations 104 using millimeter wave transmission signals. uWave eNB station 102 may communicate with mmWave eNB stations 104 through any of backhaul direct or relayed links, microwave transmission signals, microwave transmission signals, or any other desired communication technique. Upon establishing potential proximity of UE 106 to a mmWave eNB station 104, uWave eNB station 102 begins a beamformer initialization procedure to extend operation in desired coverage area 112 so that user equipment may communicate with mmWave eNB station 104 in a mmWave band, providing additional communication resources within network 100. Network 100 may also include one or more beacon stations 114 coupled to mmWave eNB stations 104 for use in establishing potential proximity of UE 106 to a mmWave eNB station 104. Beacon stations 114 may be directly or logically coupled to mmWave eNB stations 104 and may be located nearby or co-located with mmWave eNB stations 104. As an example, a uWave eNB station 102 may operate below 6 GHz while a mmW eNB station 104 may operate above 6 GHz.

Figure 2:
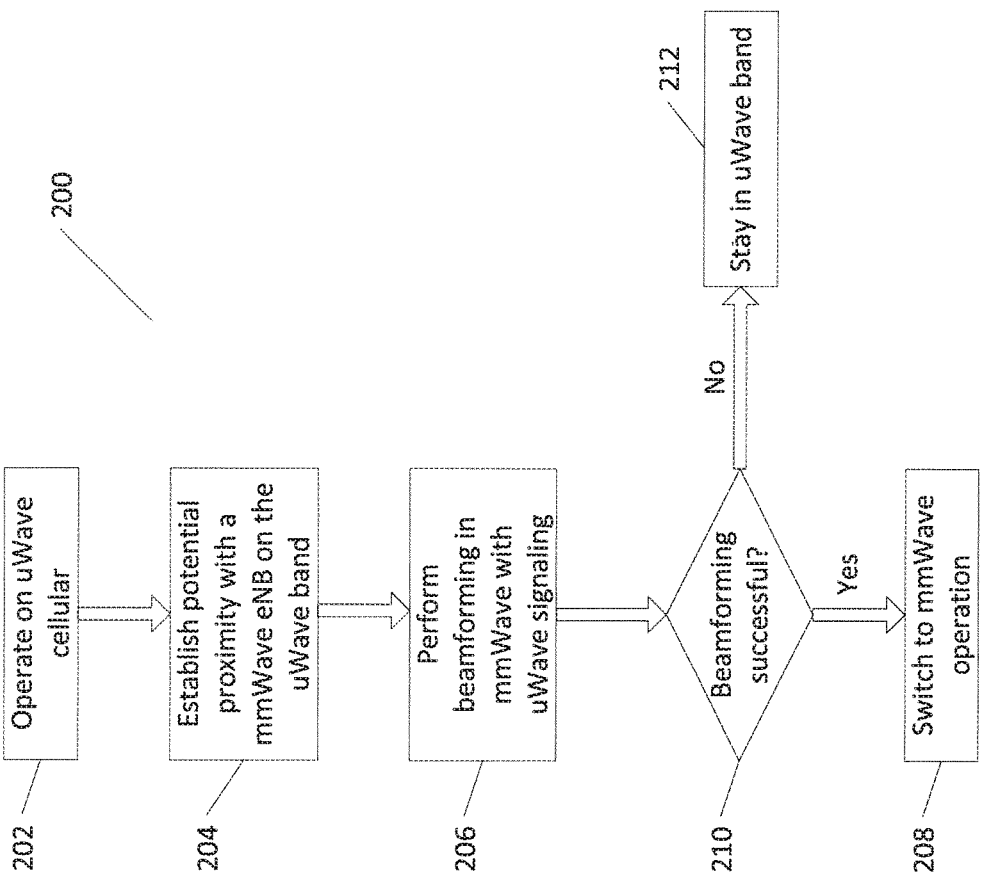
FIG. 2 illustrate a high level method for mmWave initial access.

FIG. 2 shows a high level method 200 for mmWave initial access. There are four distinct phases to establish the initial access for mmWave operation. The four phases are uWave cellular operation phase 202, potential proximity establishment phase 204, beamforming establishment phase 206, and switch to mmWave operation phase 208. For the uWave cellular operation phase 202, the UE 106 establishes communications with uWave eNB station 102 and operates in the uWave band using the LTE procedures defined for this band. For the potential proximity establishment phase 204, in order to switch to the mmWave band, the UE 106 needs to know that there are some operating mmWave eNB stations 104 in its vicinity. Such potential proximity can be established by global positioning system (GPS) coordinate reporting or any other location determining technique, or detecting a signal in the uWave band transmitted by a beacon station 114. For the beamforming establishment phase 206, the uWave eNB station 102 instructs the UE 106 to perform measurements in the mmWave band at pre-determined times, and instructs the mmWave eNB station 104 to transmit signals in the mmWave band. The UE 106 reporting is done in the uWave band. The uWave station 102 to mmWave eNB station 104 communication can be performed on a dedicated link (wired (e.g., X2 signaling), wireless, etc.). The switch to mmWave operation phase 208 begins with the UE 106 and/or the mmWave eNB station 104 testing to determine if the mmWave beamforming is successful at block 210. Once beamforming has been established, the uWave eNB station 102 "hands off" the UE 106 to the mmWave eNB station 104. If beamforming is successful, initial access is deemed successful and the UE 106 switches to mmWave operation phase 208. Note that a UE 106 may still communicate with uWave eNB 102 while it is communicating with mmWave eNB station 104. If not, the UE 106 remains in the uWave band at block 212 and continues to operate in the uWave band as before prior to attempting to beamform in the mmWave band.

Method 200 relies on using the uWave layer to exchange information between the mmWave eNB station 104 and the UE 106. A cellular link in the uWave band is established between the uWave eNB station 102 and the UE 106. The mmWave eNB stations 104 and the uWave eNB station 102 operate in a coordinated manner. The feedback used for performing the necessary beamforming for the mmWave eNB station 104 is exchanged via the uWave eNB station 102. The measurements necessary for initiating the mmWave beamforming are performed in the mmWave band.

FIGS. 3A-3C show methods performed by uWave eNB station 102, mmWave eNB station 104, and UE 106 in performing the potential proximity establishment phase 204 of FIG. 2. The UE 106 discovers the mmWave eNB stations 104 via uWave links and then reports its discovery uWave eNB station 102. Measurements are performed in the uWave band to establish potential proximity to the mmWave eNB station 104. The mmWave eNB station 104 has the capability to transmit limited signals in the uWave band. In one embodiment, reference signals are transmitted in uWave band by the mmWave eNB station 104. In another embodiment, the mmWave eNB station 104 transmits a device-to-device (D2D) discovery signal in the uWave band. In another embodiment, the mmWave eNB station 104 is in proximity to a beacon station 114 which is operating in the uWave frequency band and transmitting LTE signals including reference signals or D2D discovery signals. The UE 106 performs the measurements on either the reference signals or the D2D discovery signals and reports to the uWave eNB station 102. Note that potential proximity for mmWave eNB station 104 is established in the uWave domain. However, there is no guarantee that two proximate UEs 106 in the uWave band are proximate in the mmWave band. This is a fundamental difference with existing procedures (handoff, small cell discovery), where the initial cellular link is not broken before the UE 106 has certainty that the link quality with the new mmWave eNB 104 is good enough.

FIG. 3A shows a method 300 performed by uWave eNB station 102 in performing potential proximity establishment phase 204 of FIG. 2. In method 300, uWave eNB station 102 broadcasts to UE 106 in block 302 in a first carrier of the uWave band information related to mmWave eNB stations 104 within network 100. The information may be broadcast in a System Information Block (SIB) message or in a SIB-like message format. Information in the SIB message may include a flag indicating that the uWave eNB station 102 supports a mmWave layer, a number of mmWave eNB station 104 ports, frequencies at which the mmWave eNB stations 104 operate, mode (FDD or TDD) and pertinent configuration, and coordinates of mmWave eNB stations 104 in network 100. At block 304, uWave eNB station 102 configures Channel State Information Reference Signal (CSI-RS) ports and broadcasts a zero power CSI-RS configuration to the UE 106. uWave eNB station 102 sends a request at block 306 to mmWave eNB stations 104 to transmit a reference signal such as a non-zero power CSI-RS signal. Alternatively, uWave eNB station 102 sends a request to beacon station 114 coupled to one or more mmWave eNB stations 104 to transmit the non-zero power CSI-RS or other reference signal. Transmission of the non-zero power CSI-RS or other reference signal by beacon station 114 or by mmWave eNB station 104 may be performed using the first carrier of the uWave band or a different second carrier. uWave eNB station 102 notifies UE 106 to measure the non-zero power CSI-RS signals at block 308. At block 310, uWave eNB station 102 receives a proximity (measurement) report from UE 106.

FIG. 3B shows a method 320 performed by mmWave eNB station 104 in performing potential proximity establishment phase 204 of FIG. 2. mmWave eNB station 104 receives a request to transmit non-zero power CSI-RS signal in the uWave band at block 322. The non-zero power CSI-RS signal is then transmitted by mmWave eNB station 104 to UE 106 at block 324 over the first carrier in the uWave band or a separate second carrier in the uWave band. Alternatively, beacon station 114 coupled to one or more mmWave eNB stations 104 receives the transmit request from uWave eNB station 102 associated with one or more mmWave eNB stations 104 and transmits the non-zero power CSI-RS or other reference signal over the first carrier in the uWave band or a separate second carrier in the uWave band.

FIG. 3C shows a method 330 performed by UE 106 in the performing potential proximity establishment phase 204 of FIG. 2. UE 106 receives information related to mmWave eNB stations 104 within network 100 broadcast by uWave eNB station 102 at block 332 over a first carrier in the uWave band. The zero power CSI-RS configuration is received by UE 106 from uWave eNB station 102 at block 334. The measurement request from uWave eNB station 102 is received at block 336 by UE 106. UE 106 detects non-zero power CSI-RS signals transmitted by mmWave eNB stations 104 over the first carrier or a separate second carrier in the uWave band at block 338 and performs proximity measurements at block 340. The second carrier may be used for separate detection of these reference signals as compared to information transmitted over the first carrier by uWave eNB station 102. A proximity report is generated and sent to uWave eNB station 102 at block 342. Alternatively, UE 106 detects non-zero power CSI-RS signals transmitted by beacon station 114 coupled to one or more mmWave eNB stations 104 over the first carrier or a separate second carrier in the uWave band. The CSI-RS reference signal is cell-specific and each UE 106 uses this signal for generating channel quality indication (CQI), Precoding Matrix Index (PMI), and rank indicator (RI) estimates/measurements/reports.

When the potential proximity determination is triggered, the uWave eNB station 102 configures the UE 106 with information regarding zero power CSI-RS signals, in one embodiment, using existing radio resource control (RRC) messaging and instructs mmWave eNB stations 104 to transmit non-zero power (NZP) CSI-RS signals in the uWave band. The messaging for the non-zero power (NZP) CSI-RS signals may include information such as CSI-RS antenna port configurations used, code, power, and any other parameters desired to be detected by UE 106. The NZP CSI-RS signals may be semi-persistently scheduled or be a "one-shot" message. Note that signals other than CSI-RS could be used. Using other signal types would require creating new antenna ports and new signaling similar to the one used to signal CSI-RS might be implemented, especially if UE 106 monitors a potentially large number of mmWave eNB stations 104. Note also that the first part (configuring ZP CSI-RS) is optional. RRC messaging can be used for sending ZP CSI-RS configuration. The uWave eNB station 102 may also create blank spaces by scheduling and not scheduling transmission on some physical resource blocks (PRBs) when the NZP CSI-RS is transmitted by the mmWave eNB station 104. This however would be highly inefficient as the CSI-RS (ZP and NZP) signals are designed with low overhead and to perform measurements, such as the proximity measurement, in a way that is as least disruptive as possible to the existing cellular communication.

Once the ZP and NZP CSI-RS configurations have been received by the UE 106, the uWave eNB station 102 instructs the UE 106 to perform measurements. This message could be a dedicated RRC message, a message similar to the ones used to trigger periodic or aperiodic CSI-RS reporting, or a new type of downlink control information (DCI) message. Multiple UEs 106 could monitor the same CSI-RS signal from a given mmWave eNB station 104 at the same time. In that sense, the CSI-RS (ZP and NZP) signal could be communicated to UEs 106 either via a unicast message, a multicast message, or even a broadcast message.

The UE 106 then reports the measurements to uWave eNB 102. The reporting could be done with a dedicated RRC message or a message similar (or the same) as CSI reporting. The measurement report may contain power measurements, quality measurements, SIR/SINR/SNR measurements, reference symbol received power (RSRP), radio signal strength indicator (RSSI), and so forth. This report may be autonomously sent by the UE 106 or the uWave eNB station 102 may allocate resources for the reporting. Once the UE 106 reports the measurements, and the uWave eNB station 102 receives them, the uWave eNB station 102 may process the measurements from the measurement report and then assess potential proximity of UE 106 to a mmWave eNB station 104 and determine whether there is actual proximity to a mmWave eNB station 104 or not.

Figures 4A, 4B, 4C:
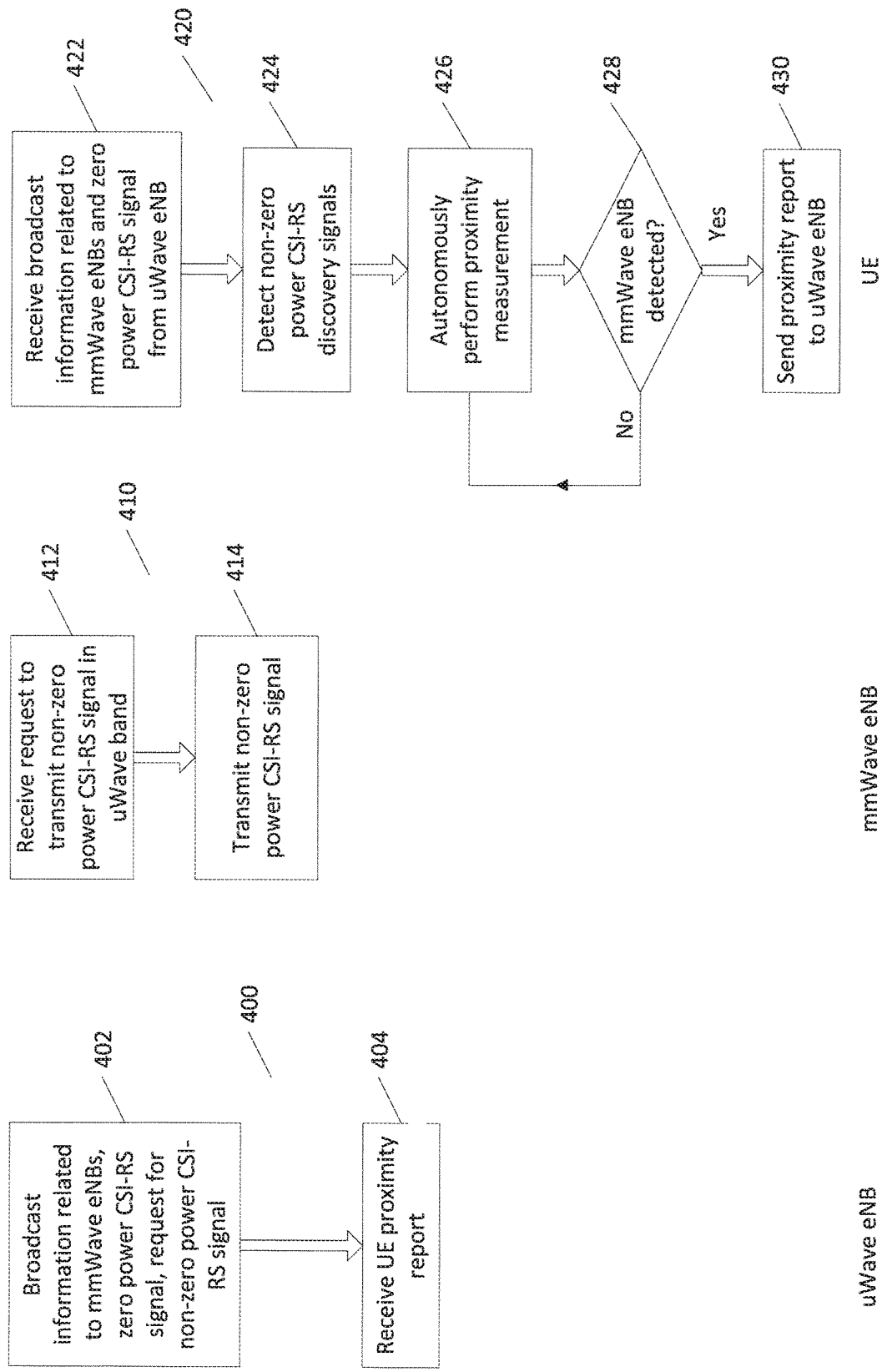
FIGS. 4A-4C illustrate alternative methods performed by the uWave eNodeB station, the mmWave eNodeB station, and user equipment in performing potential proximity establishment.

FIGS. 4A-4C show alternative methods performed by uWave eNB station 102, mmWave eNB station 104, and UE 106 in performing potential proximity establishment phase 204 of FIG. 2. This solution is a variant of the solution shown above in FIGS. 3A-3C. With the method of FIGS. 3A-3B, each time a potential proximity determination needs to be performed, some dedicated RRC signaling exchange is needed among the communication elements in network 100. To avoid signaling exchanges, the broadcast message transmitted by uWave eNB station 102 may include all CSI-RS (ZP and NZP) signal parameters. uWave eNB station 102 need not request mmWave eNB 104 to transmit NZP CSI-RS signals as mmWave eNB station 104 may be configured to autonomously transmit the NZP CSI-RS signals upon receiving the broadcast message from uWave eNB station 102, or other types of signaling (wired, wireless, etc.). uWave eNB station 102 need not request UE 106 to perform proximity measurements as UE 106 may be configured to autonomously perform the measurements and send a proximity report to uWave eNB 102.

FIG. 4A shows a method 400 performed by uWave eNB station 102 in performing the potential proximity establishment phase 204 of FIG. 2 in accordance with these alternative methods. In method 400, uWave eNB station 102 generates a SIB message with more information for broadcasting in block 402 to mmWave eNB stations 104 and UE 106 than provided in the methods of FIGS. 3A-3C. In particular, the SIB message may include information related to mmWave eNB stations 104 in network 100, a zero power CSI-RS configuration signal, and a request to transmit non-zero power CSI-RS signals. The SIB message may also include particulars for transmitting the non-zero power CSI-RS signals such as location, code, and periodicity. Other types of signaling (e.g., X2) can be used to convey the content of the broadcast message from the uWave eNB station 102 to mmWave eNB stations 104. uWave eNB station 102 then waits to receive a proximity report from UE 106 in block 404.

FIG. 4B shows a method 410 performed by mmWave eNB station 104 in performing the potential proximity establishment phase 204 of FIG. 2 in accordance with these alternative methods. From the broadcast message transmitted by uWave eNB station 102, mmWave eNB station 104 receives the request to transmit non-zero power CSI-RS signal in the uWave band and any particulars associated with transmitting such signal in block 412. mmWave eNB station 104 then transmits the non-zero power CSI-RS signal in block 414. In some cases, there may be a dense mmWave eNB layer deployed and not enough CSI-RS antenna ports available. In such a case, the CSI-RS signal of different mmWave eNB stations 104 can be multiplexed in time and/or frequency. This time/frequency multiplexing is indicated in the SIB message. Alternatively, beacon station 114 coupled to one or more mmWave eNB stations 104 receives the transmit request from uWave eNB station 102 associated with one or more mmWave eNB stations 104 and transmits the non-zero power CSI-RS or other reference signal over the first carrier in the uWave band or a separate second carrier in the uWave band.

FIG. 4C shows a method 420 performed by UE 106 in performing the potential proximity establishment phase 204 of FIG. 2 in accordance with these alternative methods. UE 106 receives the broadcast message transmitted by uWave eNB station 102 at block 422. UE 106 proceeds to detect non-zero power CSI-RS discovery signals in block 424. Instead of waiting for a measurement request from uWave eNB station 102, UE 106 autonomously performs proximity measurements at block 426 on the non-zero power CSI-RS signals transmitted by mmWave eNB stations 104 or beacon station 114. UE 106 then determines whether a mmWave eNB station 104 is detected at block 428. If so, UE generates a proximity report and sends the proximity report to uWave eNB station 102 at block 430. If no mmWave eNB station 104 is detected (or the detection is not large enough to satisfy a minimum threshold), UE 106 will continue to perform proximity measurements at block 426 until a mmWave eNB station 104 is detected.

FIGS. 5A-5C show D2D alternative methods performed by uWave eNB station 102, mmWave eNB station 104, and UE 106 in performing the potential proximity establishment phase 204 of FIG. 2. With these alternative methods, mmWave eNB station 104 transmits device-to-device (D2D) discovery signals instead of CSI-RS signals. The uWave eNB station 102 notifies the UE 106 in a broadcast message similar to the methods above indicating which D2D discovery signal each mmWave eNB station 104 uses. The UE 106 then monitors the D2D subframe. UE 106 reports to the uWave eNB station 102 the measurements on each D2D discovery signal transmitted by the mmWave eNB stations 104. While this solution is conceptually close to the 'CSI-RS' solution described above, it only requires the mmWave eNB station 104 to have the same transceiver in the uWave band as a D2D UE 106 and may be more cost efficient. One of the potential drawbacks is that the D2D discovery latency may be larger for some scenarios.

FIG. 5A shows a method 500 performed by uWave eNB station 102 in performing the potential proximity establishment phase 204 of FIG. 2 in accordance with these D2D alternative methods. The uWave eNB station 102 broadcasts a list of D2D IDs of the mmWave eNB stations 104 in block 502 so that the UEs 106 know what signals to detect. This list could be sent, e.g., in a SIB message. Alternatively, the list could be communicated to each UE 106 via dedicated RRC signaling. uWave eNB station 102 also transmits a request for discovery signals, and any particulars associated therewith, to trigger the mmWave eNB station 104 or a beacon station 114 to transmit a D2D discovery signal. The request for discovery signals may be part of the broadcast message or transmitted separately therefrom. uWave eNB station 102 then waits to receive a proximity report from UE 106 in block 504. In an alternate embodiment, uWave eNB station 106 may not need to communicate a list of D2D IDs at all, but each D2D discovery signal coming from a mmWave eNB station 104 could indicate that it is a mmWave eNB station 104 by a specific field in the discovery signal, a different range of group IDs, different scrambling, or any other desired indication.

FIG. 5B shows a method 510 performed by mmWave eNB station 104 in performing the potential proximity establishment phase 204 of FIG. 2 in accordance with these D2D alternative methods. From the broadcast message transmitted by uWave eNB station 102, mmWave eNB station 104 receives the request to transmit a D2D discovery signal in the uWave band and any particulars associated with transmitting such signal in block 512. mmWave eNB station 104 then transmits the D2D discovery signal in block 514.

FIG. 5C shows a method 520 performed by UE 106 in performing the potential proximity establishment phase 204 of FIG. 2 in accordance with these D2D alternative methods. UE 106 receives the broadcast message transmitted by uWave eNB station 102 at block 522. Instead of waiting for a measurement request from uWave eNB station 102, UE 106 autonomously monitors D2D discovery subframes for mmWave discovery signals at block 524. UE 106 performs measurements on detected D2D discovery signals at block 526 transmitted by mmWave eNB stations 104. UE 106 then determines whether a mmWave eNB station 104 is detected at block 528. If so, UE generates a proximity report and sends the proximity report to uWave eNB station 102 at block 530. If no mmWave eNB station 104 is detected (or the detection is not large enough to satisfy a minimum threshold), UE 106 will continue to perform proximity measurements at block 526 until a mmWave eNB station 104 is detected. The discovery report sent by the UE 106 may be on-demand, periodically sent, or only sent when a mmWave eNB station 104 has been detected.

The mmWave eNB information broadcast by uWave eNB station 102 to the UE 106 may be provided using broadcast RRC signaling (SIB), dedicated RRC signal, or a combination of both. This information may be provided before or after the trigger to initiate proximity establishment. The information may comprise a flag to indicate if there is one or more mmWave eNB stations 104 around, a frequency at which the mmWave eNB stations 104 operate, a mode (such as frequency division duplex (FDD) and time division duplex (TDD)) and associated configuration, coordinates of mmWave eNB stations 104, a list of signal location in the uWave band where mmWave eNB stations 104 transmit discovery signals, and a list of D2D code/location to monitor if used. A signal location may comprise a signal index, a subframe index (or a list of subframe indexes), a frequency index (PRB list), parameters of a hopping sequence, and so forth. The signal location may be semi-persistently signaled.

Once this information has been provided, the uWave eNB station 102 receives a proximity report from the UE 106 to indicate its proximity to mmWave eNB stations 104. This report may be autonomously sent by the UE 106 or the uWave eNB station 102 may allocate resources for the reporting. Also, the uWave eNB station 102 may instruct mmWave eNB stations 104 to transmit these discovery signals and may allocate resources for such transmission. If the proximity determination is based on geographical coordinates, the uWave eNB station 102 does not need to allocate resources to the mmWave eNB station in the uWave band. Once the report from the UE is received, the uWave eNB station 102 determines if there is proximity and may decide to initiate the beamforming procedure.

Figure 6:
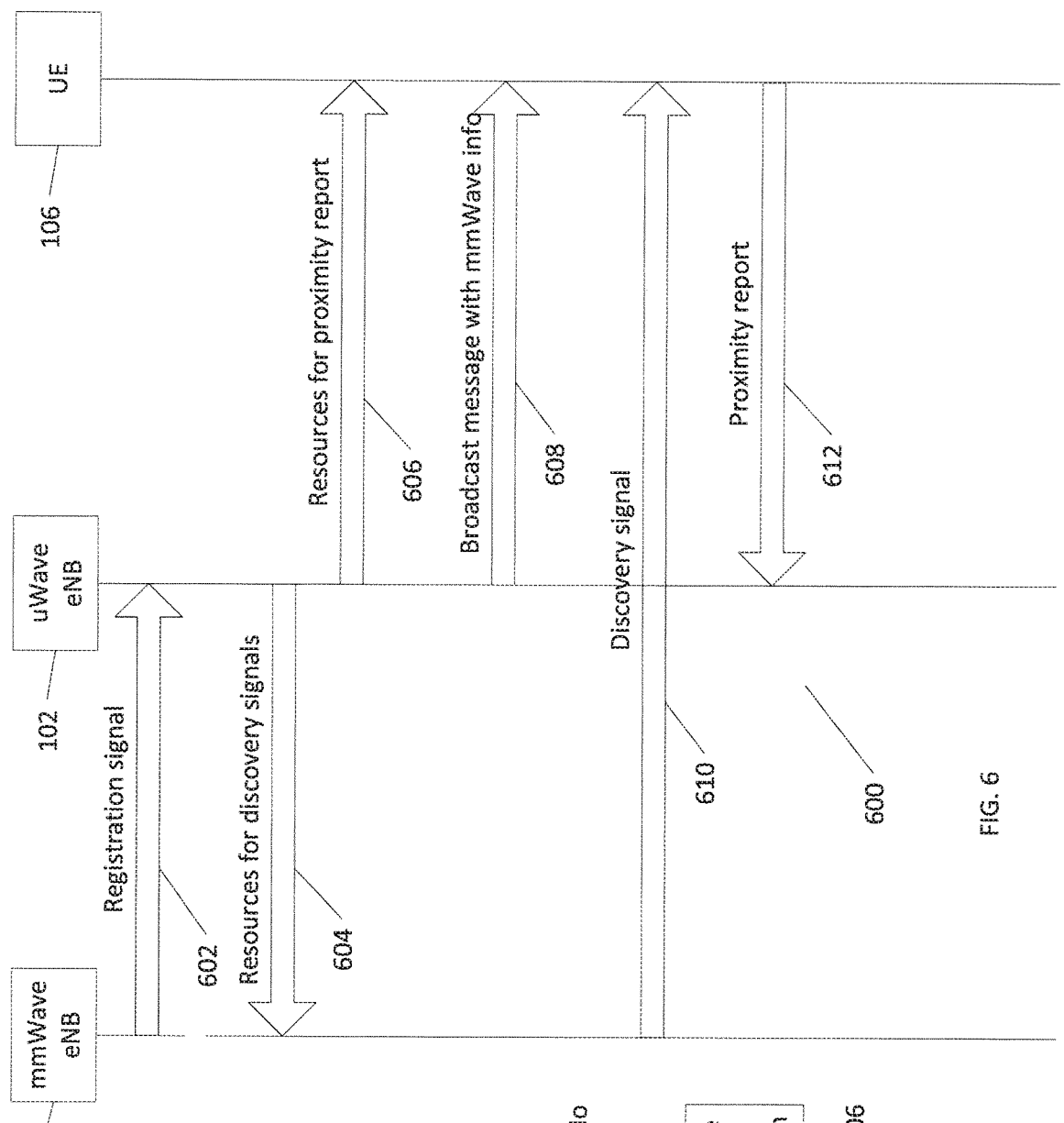
FIG. 6 illustrates an example registration method between the uWave eNodeB station and a mmWave eNodeB station.

FIG. 6 shows an example registration method 600. In order to establish connectivity, the uWave eNB station 102 needs to be aware of the existence and location of the mmWave eNB stations 104 and allocate some resources for the mmWave eNB stations 104. When D2D discovery is used, this step is optional, since a D2D UE 106 can autonomously transmit a D2D discovery signal if operating with type-1 discovery. Note, however, that since the uWave eNB station 102 and mmWave eNB stations 104 need to exchange information, using type-1 discovery may not be the most attractive solution. In order to have the uWave eNB station 102 aware of the mmWave eNB stations 104, registration method 600 is performed. Registration method 600 begins with mmWave eNB stations 104 sending a registration signal 602. uWave eNB station 102 receives registration signal 602 from mmWave eNB stations 104 and registers the existence of mmWave eNB stations 104. If registration is successful, uWave eNB station 102 allocates resources in the uWave band for mmWave eNB stations 104 to send discovery signals. uWave eNB station 102 sends a resource allocation signal 604 to mmWave eNB stations 104. If registration is unsuccessful, mmWave eNB station 104 continues to operate in the mmWave band. uWave eNB station 102 also allocates resources in the uWave band for UE 106 to send the proximity report. uWave eNB station 102 sends a resource allocation signal 606 to UE 106. Upon learning of mmWave eNB stations 104, uWave eNB station 102 may send broadcast message 608 to UE 106 including information related to the registered mmWave eNB stations 104. After registration, mmWave eNB station 104 transmits a discovery signal 610, either D2D or CSI-RS. UE 106 detects discovery signal 610, performs proximity measurements, and generates a proximity report 612 for transmission to uWave eNB 102.

Once the uWave operation is established, there may be a trigger to attempt to switch UE 106 to the mmWave band. This trigger may be initiated by uWave eNB station 102 to initiate the proximity establishment procedure and switch UE 106 to the mmWave band based on traffic conditions. This trigger may be initiated by UE 106 if it decides that more bit rate is needed. A request may be made by UE 106 that may or may not be granted by uWave eNB station 102 or other network entities. This trigger may also be initiated by network entities (such as a Mobility Management Entity unit or High Level Architecture unit) by sending a command to uWave eNB station 102 to switch the UE 106 to the mmWave band.

Figure 7:
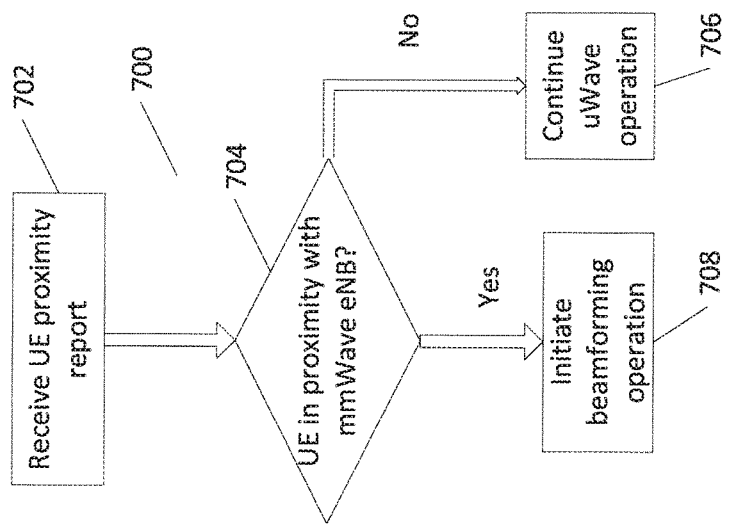
FIG. 7 illustrates a method performed by the uWave eNodeB station upon receiving a proximity report from user equipment.
Figure 8:
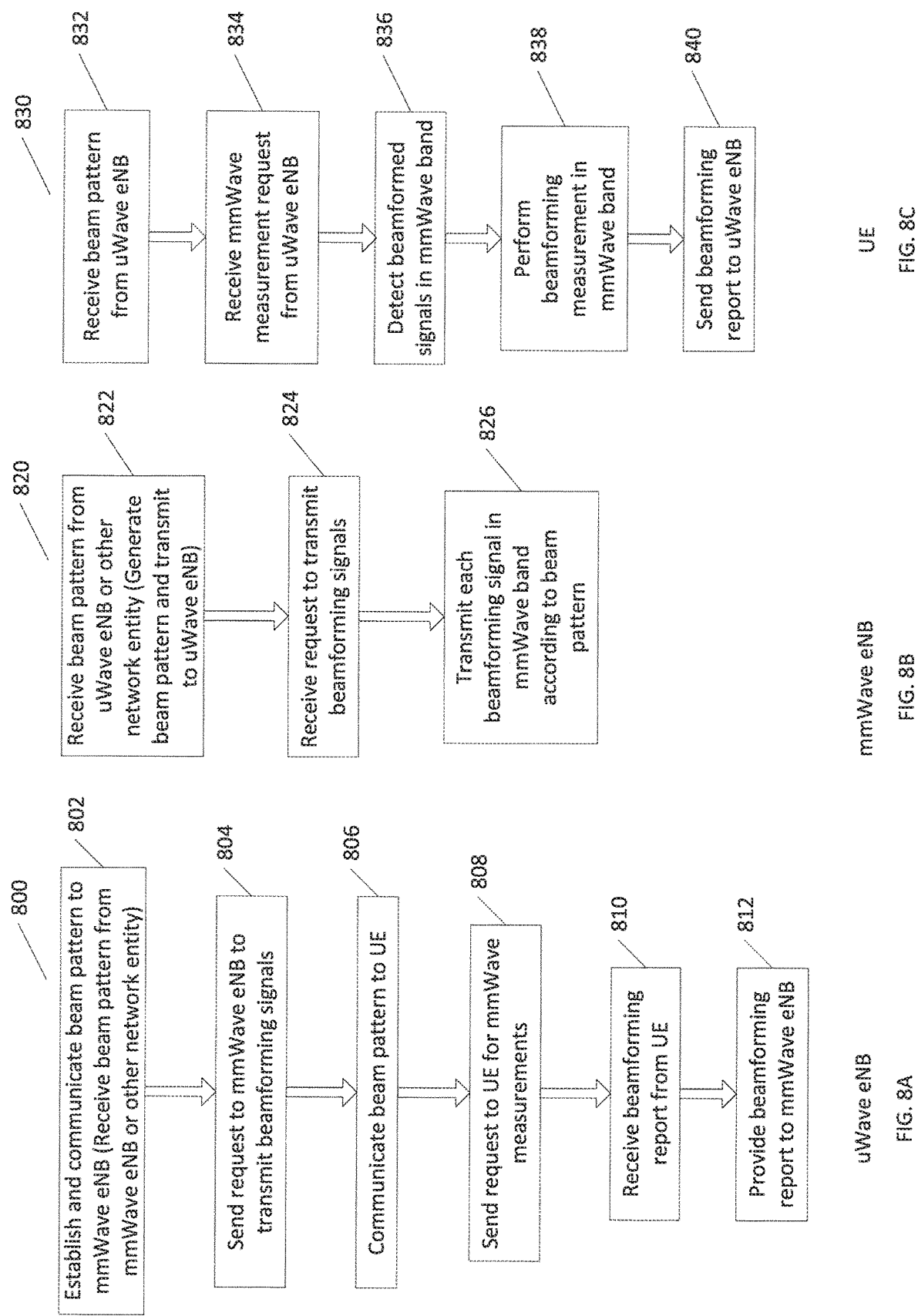
FIGS. 8A-8C show methods performed by the uWave eNodeB station, the mmWave eNodeB station, and user equipment in initiating a beamforming operation.

FIG. 7 shows a method 700 performed by uWave eNB station 102 upon receiving a proximity report. Method 700 begins at block 702 upon receipt of the proximity report from UE 106. uWave eNB station 102 then determines at block 704 whether UE 106 is in proximity with a mmWave eNB station 104. uWave eNB station 106 compares the measurements in the proximity report to threshold values. If the threshold values are not exceeded, uWave eNB station 102 will not initiate mmWave band operation for UE 106 and UE 106 will continue to operate in the uWave band in block 706. If threshold values are exceeded, uWave eNB station 102 will initiate beamforming operations in block 708.

FIGS. 8A-8C show methods performed by uWave eNB station 102, mmWave eNB station 104, and UE 106 in initiating the beamforming operation of block 708 in FIG. 7. Once proximity is established, the uWave eNB station 102 may initiate the method to perform beamforming in the mmWave band. In general, uWave eNB station 102 triggers mmWave eNB station 104 to start transmitting beamformed beacons in the mmWave band. uWave eNB station 102 triggers UE 106 to search for beamformed beacons and perform measurements thereon. The difficulty here lies in the fact that the UE 106 and the mmWave eNB stations 104 cannot yet communicate with each other in the mmWave band as there has been no handshake between the two in the mmWave band. UE 106 and mmWave eNB stations 104 rely on the uWave eNB station 102 to exchange information in the uWave band prior to mmWave band communication establishment.

Prior to mmWave band operation, a beam pattern is first established for use by mmWave eNB station 104 and, depending on the entity establishing the beam pattern, communicated to the appropriate entities. In one embodiment, uWave eNB station 102 establishes the beam pattern. In another embodiment, mmWave eNB station 104 chooses its own beam pattern. In yet another embodiment, the beam pattern is determined by another network entity and communicated to both uWave eNB station 102 and mmWave eNB stations 104. The establishment of the beam pattern does not need to occur each time upon performing the beamforming operation. The beam pattern may be pre-determined once and then would always apply for the beamforming operation. There may be a codebook entry corresponding to each beam pattern.

The configuration for the beam pattern indicates the resources where each of the beams will be transmitted. The beam pattern may be scheduled on demand when needed for a measurement, semi-persistently scheduled in an on/off manner or with a trigger from uWave eNB station 102, or persistently scheduled, with the mmWave eNB always using the same pattern. While the pattern is always the same, the transmission duration or time (on/off) could be controlled by uWave eNB station 102 to avoid interference or for power saving purposes. The signal transmitted on the beam could be a pilot sequence to perform measurements or a pilot sequence and a short message to perform better quality measurements and provide additional information that identifies the beam direction and the cell as needed.

FIG. 8A shows a method 800 performed by uWave eNB station 102 in initiating the beamforming operation of block 708 in FIG. 7. Method 800 begins at block 802 where a beam pattern is established and communicated to mmWave eNB station 104. As discussed above, alternative embodiments have the beam pattern established and communicated to uWave eNB station 102 by one of mmWave eNB station 104 or another network entity. At block 804, uWave eNB station 102 sends a request to mmWave eNB stations 104 to transmit beamforming signals (transmitted in the mmWave band). Upon establishment/receipt of the beam pattern, uWave eNB station 102 communicates the beam pattern to UE 106 at block 806. The uWave eNB station 102 may communicate the beam pattern to the UE 106 by Common RRC (SIB) messaging (this solution is appealing if the pattern is persistently scheduled or is always the same), dedicated RRC signaling, physical layer signaling, or any other desired signaling protocol. uWave eNB station 102 then sends a request to UE 106 at block 808 to begin mmWave band measurements of beamforming signals. uWave eNB station 102 then awaits receipt of a beamforming report from UE 106 at block 810. The beamforming report or an evaluation of the beamforming report may be sent by uWave eNB station 102 to mmWave eNB stations 104 at block 812.

FIG. 8B shows a method 820 performed by mmWave eNB station 104 in initiating the beamforming operation. Method 820 begins at block 822 where mmWave eNB station 104 receives the configuration for the beam pattern from uWave eNB station 102 or, in another embodiment, from another network entity. Alternatively, mmWave eNB station 104 generates the beam pattern and transmits the configuration for the beam pattern to uWave eNB station 102. At block 824, mmWave eNB station 104 receives a request from uWave eNB station 102 to transmit beamforming signals. When transmitted, the request may include a time indication of when to send the beamforming signals (e.g., subframe index) and a frequency indication of where to transmit the beamforming signals. The request may be a one-time request or may be a semi-persistent allocation. In some embodiments, mmWave eNB stations 104 may always transmit the beamforming signals and may not need to be requested to do so by uWave eNB station 102. mmWave eNB station 104 then transmits the beamforming signals in the mmWave band at block 826.

FIG. 8C shows a method 830 performed by UE 106 in initiating the beamforming operation. Method 830 begins at block 832 where UE 106 receives the configuration for the beam pattern from uWave eNB station 102. Upon receiving a mmWave measurement request from uWave eNB station 102 at block 834, UE 106 detects beamforming signals in the mmWave band transmitted by mmWave eNB stations 104 at block 836. On detected beamforming signals, UE 106 performs measurements thereon at block 838. UE 106 then generates and sends a beamforming report to uWave eNB station 102 at block 840.

Once the beam pattern has been established, mmWave eNB stations 104 transmit the beam according to the pattern. The beamforming signals transmitted by mmWave eNB stations 104 may be pilot signals or any other type of signal that mmWave eNB stations 104 are configured to transmit. The only requirement of these beamforming signals are that they are sufficient to allow performance of power and/or quality measurements. uWave eNB station 102 may notify mmWave eNB stations 104 of when/where the beamforming signals are to be sent during registration of the mmWave eNB stations 104 or as part of the request to transmit the beamforming signals. In other embodiments, when/where the beamforming signals are to be sent is determined by mmWave eNB stations 104 or other network entities.

The request to instruct the UE 106 to perform the measurements can be done by sending a dedicated RRC message, by using physical layer signaling using a specific DCI-like message, or any other messaging protocol. The message may include an indication to perform the measurements, the time/frequency location of where to perform the measurements, and resources for sending the beamforming report.

uWave eNB station 102 receives the beamforming report from the UE 106 in the uWave band. The beamforming report may be sent on resources allocated by uWave eNB 102 or may be autonomously sent by the UE 106. The beamforming report may include power measurements (e.g., RSRP, RXLEV), quality measurements (RXQUAL), and SNR/SINR/SIR measurements. Based at least in part on these measurements, uWave eNB station 102 can then decide whether or not to switch UE 106 to the mmWave eNB station 104.

Figure 9:
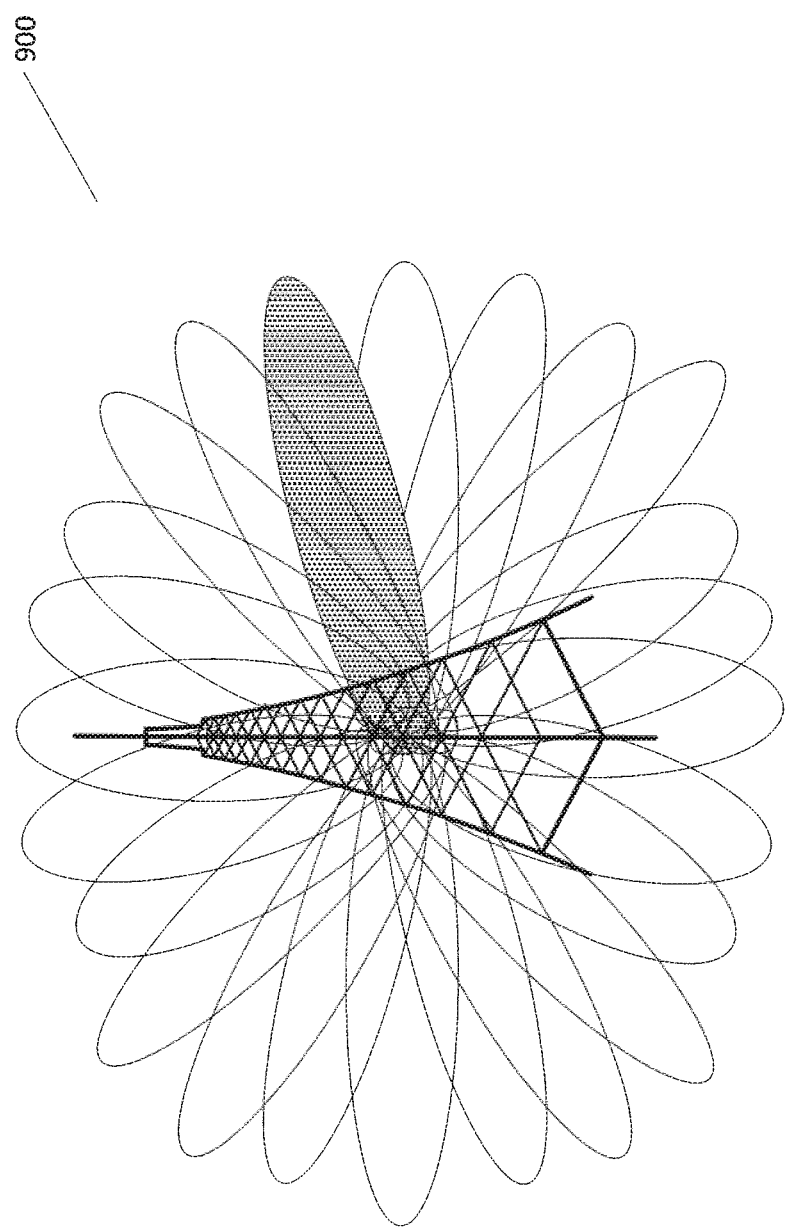
FIG. 9 illustrates an example beamforming pattern used by the mmWave eNodeB stations.

FIG. 9 shows an example beamforming pattern 900 used by mmWave eNB stations 104. In one embodiment, mmWave eNB stations 104 use a rotating pattern for a narrow beam. mmWave eNB station 104 transmits each beam sequentially, using a well-defined sequence, or randomly. A beam reference signal is transmitted on the beam. The beam reference signal may be a specified signal or carry information specific to each direction. In addition, the beam reference signal may carry information specific to the particular mmWave eNB station 104.

When the UE 106 receives the pattern, it attempts to obtain the beam reference signal on each of the received beams in the mmWave domain. The UE 106 performs measurements, such as RSRP, on this beam reference signal and can then determine which beam is appropriate for communication with the particular mmWave eNB station 104. Once the suitable beam is/are identified based on the criteria discussed above, the UE 106 then reports to the uWave eNB station 102 in the uWave band the preferred beam(s). The criteria to determine the appropriate beam may be signaled by the mmWave eNB station 104, uWave eNB station 102, or may be provisioned in the UE 106 by other means (for instance might be a maximum (minimum) value of signal strength out of all the received beamformed signals). An appropriate beam may be a best overall beam (in terms of RSRP, SINR, etc.), a beam whose measurement exceeds a RSRP or SINR threshold, a beam good enough to meet the frame error rate (FER) requirements for the UE 106, or any other desired characteristics.

The beamforming report may include a signal to interference noise ratio (SINR), signal to noise ratio (SNR), and signal to interference ration (SIR) value for each of the beams and a bitmap indicating which beam(s) are suitable. The beamforming report may also include information related to the beamformer used at the UE 106, e.g., how many antennas are used by the UE 106 to perform beamforming measurements, such a subset of the antennas (e.g., 4 out of 16), thereby notifying uWave eNB station 102 that it could do better in terms of overall beamforming gain. The reason to only use a subset of antennas would be to have a wider beam and be less sensitive to impairments resulting from mobility.

Once the beamforming report has been received from UE 106, uWave eNB station 102 may communicate the beamforming report to the mmWave eNB station 104. In another embodiment, uWave eNB station 102 may process the beamforming report and may communicate results of the processing to the mmWave eNB station 104. As a result, both the UE 106 and the mmWave eNB station 104 know which beamforming coefficients (such as a codeword index, a codeband index, or with the coefficients encoded in a reference signal such as analog feedback) to use to start the initial mmWave band access procedure.

Figures 10A, 10B, 10C:
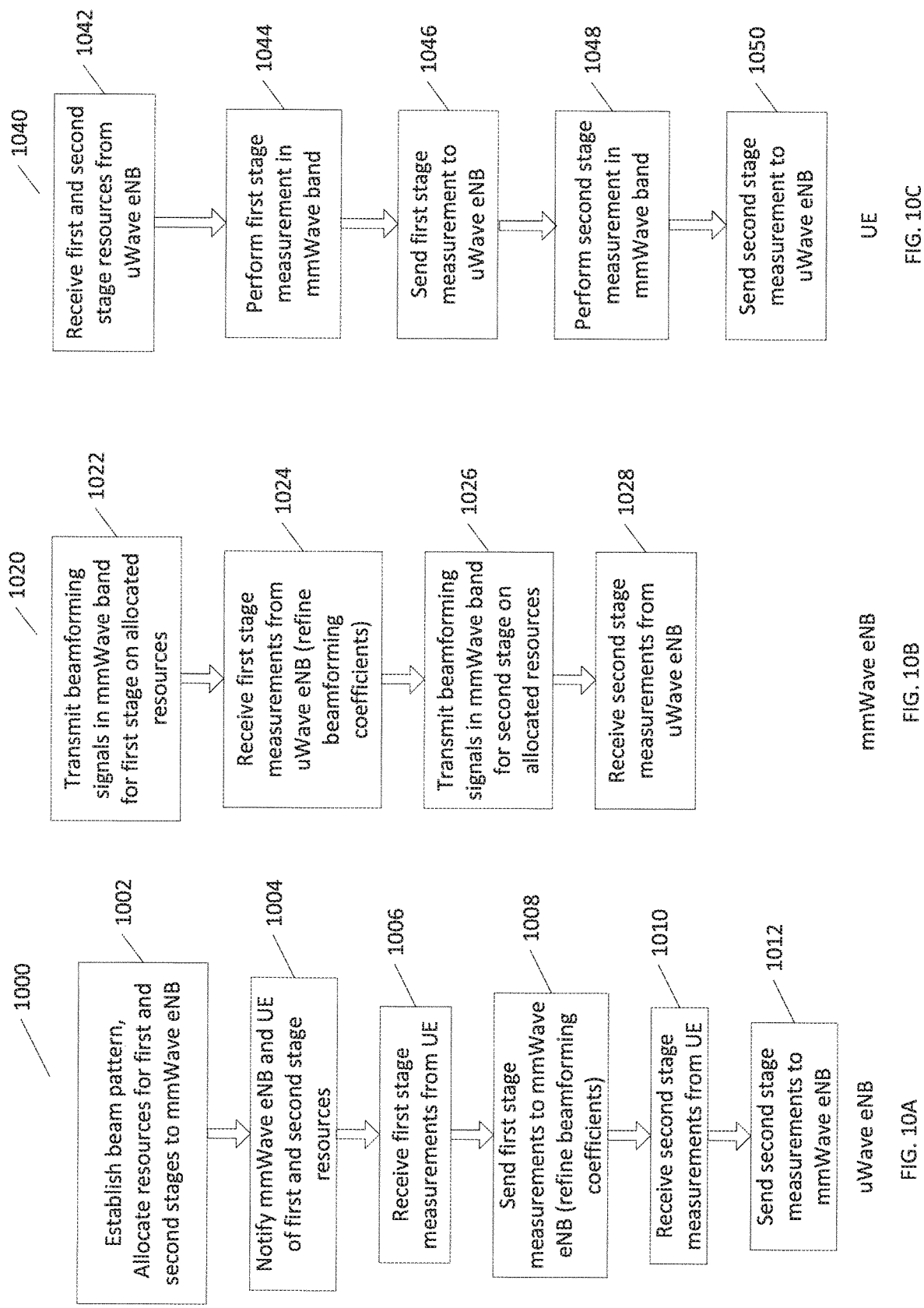
FIGS. 10A-10C illustrate alternative methods performed by the uWave eNodeB station, the mmWave eNodeB station, and user equipment in performing the beamforming operation.

FIGS. 10A-10C show alternative methods performed by uWave eNB station 102, mmWave eNB station 104, and UE 106 in performing the beamforming operation. In this alternative embodiment, a fast hybrid beamforming technique for initial access may be performed. In fast hybrid beamforming, a first stage coarse beamforming is obtained. The UE 106 feeds back information to the mmWave eNB station 104 through uWave eNB station 102. A second stage fine beamforming is performed, where the feedback from the UE 106 is used to refine beamforming coefficients used by mmWave eNB station 104 to achieve fine beamforming toward that UE 106.

FIG. 10A shows a method 1000 performed by uWave eNB station 102 in performing the beamforming operation. Method 1000 begins at block 1002 where the beam pattern is established and resources are allocated for the first stage coarse beamforming and the second stage fine beamforming. uWave eNB station 102 informs mmWave eNB stations 104 and UE 106 in block 1004 of the allocated resources. uWave eNB station 102 receives a beamforming report from UE 106 with first stage measurements at block 1006. The first stage measurements may be sent by uWave eNB station 102 to mmWave eNB stations 104 at block 1008. At this point, uWave eNB station 102 may refine beamforming coefficients based on the first stage measurements and provide the beamforming coefficients to mmWave eNB stations 104. In addition, uWave eNB station 102 may adjust the allocated resources based on the first stage measurements and notify mmWave eNB stations 104 and UE 106 of the adjusted resources. uWave eNB station 102 receives a beamforming report from UE 106 with second stage measurements at block 1010. The second stage measurements may be sent by uWave eNB station 102 to mmWave eNB stations 104 at block 1012.

FIG. 10B shows a method 1020 performed by mmWave eNB stations 104 in performing the beamforming operation. Method 1020 begins at block 1022 where mmWave eNB station 104 transmits beamforming signals according to the first stage coarse beamforming resources allocated by uWave eNB station 102. At block 1024, mmWave eNB station 104 receives the first stage measurements as determined by UE 106 and refined beamforming coefficients from uWave eNB station 102. Alternatively, mmWave eNB station 104 refines the beamforming coefficients from the first stage measurements. mmWave eNB station 104 then transmits beamforming signals at block 1026 in the mmWave band according to second stage fine beamforming resources allocated by uWave eNB station 102. In other embodiments, mmWave eNB station 104 allocates the resources for beamforming signal transmission and notifies uWave eNB station 102 of the allocation. At block 1028, mmWave eNB station 104 may receive the second stage measurements as determined by UE 106 from uWave eNB station 102.

FIG. 10C shows a method 1040 performed by UE 106 in performing the beamforming operation. Method 1040 begins at block 1042 where UE 106 receives the first stage and second stage resource allocations from uWave eNB station 102. In other embodiments, UE 106 first receives first stage resource allocations from uWave eNB station 102 and later receives second stage resource allocations from uWave eNB station 102 when second stage fine beamforming operation is performed. UE 106 detects beamforming signals transmitted from mmWave eNB stations 104 according to the first stage resource allocation and performs first stage measurements of detected beamforming signals at block 1044. The first stage measurements are sent to uWave eNB station 102 at block 1046. UE 106 detects beamforming signals transmitted from mmWave eNB stations 104 according to the second stage resource allocation and performs second stage measurements of detected beamforming signals at block 1048. The second stage measurements are sent to uWave eNB station 102 at block 1050.

FIGS. 11A-11C show methods performed by uWave eNB station 102, mmWave eNB station 104, and UE 106 in switching UE 106 from uWave band operation to mmWave band operation. In general, uWave eNB station 102 first allocates resources in the mmWave band for mmWave eNB stations 104 and UE 106. Note that the allocation could be done by mmWave eNB station 104 (with or without being requested by uWave eNB station 102) or by another network entity. Once resource allocation has been performed, uWave eNB station 102 notifies mmWave eNB stations 104 and UE 106 of which resource(s) to use for initial access. UE 106 then attempts to perform the initial access according to the allocated resources. If the attempt is successful, UE 106 is switched over to mmWave band operation. If a problem arises, either at mmWave eNB stations 104 or UE 106, one of these two entities can notify uWave eNB station 102 of the failure and the operation can then revert to uWave band operation. In another embodiment, the transmission of data between mmWave eNB stations 104 and UE 106 can use the mmWave band while network operations (including mobility management, transfer of control information such as RRC signaling) can use the link in the uWave band established between uWave eNB station 102 and UE 106. UE 102 has two links, one mmWave band link to mmWave eNB station 104 and one uWave band link to uWave eNB station 102. Having two links allows the network to manage the UE 106 in case the mmWave link fails due to events such as blockage.

FIG. 11A shows a method 1100 performed by uWave eNB station 102 in switching UE 106 to mmWave operation. Method 1100 begins at block 1102 where uWave eNB station 102 receives a beamforming report from UE 106. At block 1104, uWave eNB station 102 determines from the beamforming report whether UE 106 has received mmWave signals from mmWave eNB station 104 of sufficient strength to indicate that beamforming has been established. If not, UE 106 will continue to communicate with uWave eNB station 102 in the uWave band at block 1106. If beamforming has been established, uWave eNB station 102 will allocate mmWave band resources to mmWave eNB station 104 for UE 106 initial access at block 1108. uWave eNB station 102 sends a message to mmWave eNB station 104 that may include the identity of UE 106, a code/preamble, a subframe index, a frequency in one or more PRB indexes, and any other information related to UE 106 access. In other embodiments, the resource allocation may be performed by mmWave eNB station 104 or by another network entity. At block 1110, uWave eNB station 102 sends a request to UE 106 to switch to the mmWave band. uWave eNB station 102 receives a switch indication from UE 106 at block 1112. uWave eNB station 102 monitors UE 106 for any failure in the mmWave band switch operation at block 1114. If a switch fail occurs, UE 106 continues to communicate with uWave eNB station 102 in the uWave band at block 1116. If the switch is successful, block 1118 shows that UE 106 operates in the mmWave band and communicates with mmWave eNB station 104. uWave eNB station 102 continues to monitor UE 106 at block 1114 for a failure indication in the mmWave operation and will switch UE 106 to communicate with uWave eNB station 102 in the uWave band upon receiving such failure indication.

FIG. 11B shows a method 1120 performed by mmWave eNB stations 104 in switching UE 106 to mmWave operation. Method 1120 begins at block 1122 where mmWave eNB station 104 receives mmWave band resources from uWave eNB station 102 for UE 106 access. Then, at block 1124, mmWave eNB station 104 communicates with UE 106 over the mmWave band to coordinate the communication session. If access to UE 106 is not successful at block 1126, mmWave eNB station 104 sends a failure indication to uWave eNB station 102 at block 1128. If access is successful at block 1126, mmWave eNB station 104 sends a success indication to uWave eNB station 102 at block 1130 and begins the communication session with UE 106 over the mmWave band at block 1132. mmWave eNB station 104 will continue to monitor for UE 106 access in the communication session at block 1126 and send a failure indication to uWave eNB station 102 at block 1128 whenever communication with UE 106 over the mmWave band is lost.

FIG. 11C shows a method 1140 performed by UE 106 in switching UE 106 to mmWave operation. Method 1140 begins at block 1142 where UE 106 receives a request from uWave eNB station 102 to switch to mmWave band operation. At block 1144, UE 106 switches to mmWave band operation and coordinates access with mmWave eNB station 104. If the switch to mmWave band operation is not successful at block 1146, UE 106 sends a failure indication to uWave eNB station 102 at block 1148 and communicates with uWave eNB station 102 in the uWave band at block 1150. If access to mmWave eNB station 104 is successful at block 1146, UE 106 sends a success indication to uWave eNB station 102 at block 1152 and communicates with mmWave eNB station 104 in the mmWave band at block 1154. UE 106 will continue to monitor its communication session with mmWave eNB station 104 at block 1146 and send a failure indication to uWave eNB station 102 at block 1148 and communicate with uWave eNB station 102 in the uWave band at block 1150 whenever communication with mmWave eNB station 104 is lost. In another embodiment, as a result of block 1154, UE 106 can simultaneously maintain communications with the uWave eNB station 102 in the uWave band and with the mmWave eNB station 104 in the mmWave band.

Figure 12:
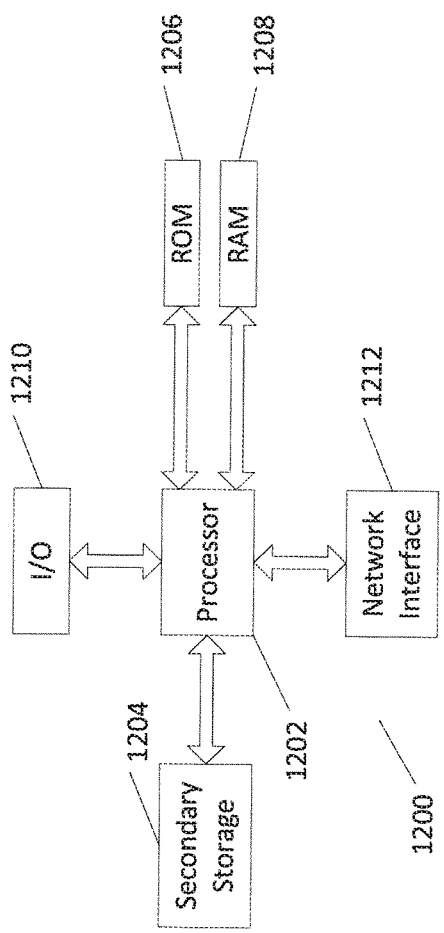
FIG. 12 illustrates a block diagram of an example processing system which may be implemented in the uWave eNodeB station, mmWave eNodeB station, and user equipment.

FIG. 12 shows a block diagram of an example processing system for performing methods described herein, which may be implemented in uWave eNB station 102, mmWave eNB station 104, and UE 106. The components described for uWave eNB station 102, mmWave eNB station 104, and UE 106 may be implemented on any one or more general-purpose computing component, such as a computer or network component with sufficient processing power, memory resources, and network throughput capability to handle the necessary workload placed upon it. Processing system 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network/component connectivity devices 1212. The processor 1202 may be implemented as one or more CPU chips, or may be part of one or more application specific integrated circuits (ASICs). The processor 1202 may be any component or collection of components adapted to perform computations and/or other processing related tasks. Secondary storage 1204, read only memory (ROM) 1206, and random access memory (RAM) 1208 may be any component or collection of components adapted to store programming and/or instructions for execution by processor 1202.

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204. Additional processors and memory devices may be incorporated based on the function of each component within uWave eNB station 102, mmWave eNB station 104, and UE 106.

Network/component connectivity devices 1212 may be any component or collection of components that allow processing system 1200 to communicate with other devices/components and/or a user. For example, one or more of network/component connectivity devices 1212 may be adapted to communicate data, control, or management messages from processor 1204 to applications installed on the host device and/or a remote device. As another example, one or more of network/component connectivity devices 1112 may be adapted to allow a user or user device (e.g., personal computer (PC), etc.) to interact/communicate with the processing system 1200.

As discussed above, the processing system 1200 may be included in a network device that is accessing, or part otherwise of, a telecommunications network 100. In one example, the processing system 1200 may be a network-side device in a wireless or wireline telecommunications network 100, such as a base station, a relay station, a scheduler, a controller, a gateway, a router, an applications server, or any other device in telecommunications network 100. In other embodiments, the processing system 1200 is in a user-side device accessing a wireless or wireline telecommunications network 100, such as a mobile station, a user equipment (UE), a personal computer (PC), a tablet, a wearable communications device (e.g., a smartwatch, etc.), or any other device adapted to access telecommunications network 100. In some embodiments, one or more of network/component connectivity devices 1212 connects the processing system 1200 to a transceiver adapted to transmit and receive signaling over telecommunications network 100.

Figure 13:
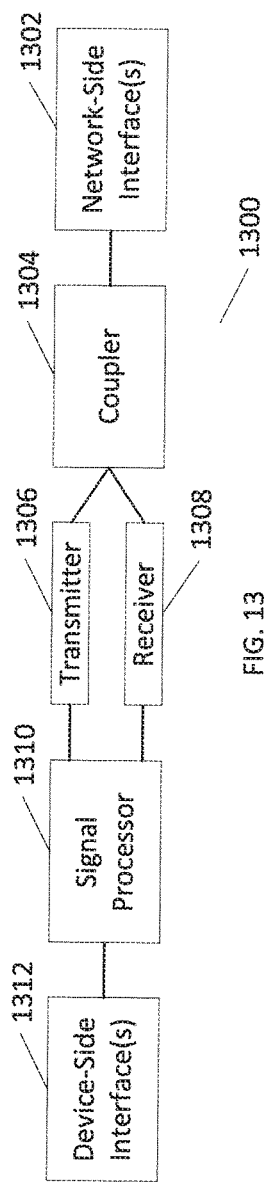
FIG. 13 illustrates a block diagram of an example transceiver which may be implemented in the uWave eNodeB station, mmWave eNodeB station, and user equipment.

FIG. 13 illustrates a block diagram of a transceiver 1300 adapted to transmit and receive signaling over telecommunications network 100. One or more transceivers 1300 may be implemented in uWave eNB station 102, mmWave eNB station 104, and UE 106. Transceivers 1300 provide uWave band and mmWave band signaling. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network 100. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. For example, although the embodiments are expressed using uWave and mmWave bands, the embodiments are applicable to scenarios such as dense networks. In this example, mmWave eNB stations 104 could represent low powered base stations for small cells. Other changes, substitutions, and alterations are also possible without departing from the scope of this disclosure as defined by the following claims.

What is claimed is:

1. A method for providing user equipment (UE) access to a millimeter wave (mmWave) base station through a microwave (uWave) base station, the method comprising:
   communicating, by the uWave base station, with the UE in a uWave band;
   sending, by the uWave base station, a request to the mmWave base station to transmit non-zero power Channel State Information Reference Signal(s) (CSI-RS(s)) in the uWave band;
   transmitting, by the uWave base station to the UE, a system information block (SIB) or radio resource control (RRC) message including reference signal (RS) configuration information identifying RS resources over which the non-zero power CSI-RS(s) are to be transmitted by the mmWave base station, the RS configuration information including at least one of antenna port configuration information, frequency information, code information, or power information of the RS resources for the non-zero power CSI-RS(s), the SIB or RRC message including instructions for the UE to take quality measurement(s) of the non-zero power CSI-RS(s), both the mmWave base station and the uWave base station belonging to a common cellular access network, and the SIB message including information for multiplexing a plurality of CSI-RSs from a plurality of mmWave base stations;
   receiving, by the uWave base station from the UE, a measurement report in the uWave band that indicates the quality measurement(s) of the non-zero power CSI-RS(s) transmitted by the mmWave base station; and
   continuing, by the uWave base station, the communications with the UE in the uWave band for at least a time period after the mmWave base station establishes communications with the UE using a mmWave beam.

2. The method of claim 1, the SIB or RRC message further indicating that the uWave base station supports at least one of the following: a mmWave layer, a specific number of mmWave base station ports, the RS resources over which the non-zero power CSI-RS(s) are to be transmitted by the mmWave base station, or coordinates of the mmWave base station.

3. The method of claim 1, further comprising:
   determining, by the uWave base station, a proximity of the UE to the mmWave base station based on the quality measurement(s) of the non-zero power CSI-RS(s) transmitted by the mmWave base station, the proximity of the UE to the mmWave base station being used to select the mmWave beam.

4. The method of claim 1, the communications in the uWave band comprising control signaling for supporting data transmissions between the UE and the mmWave base station using the mmWave beam.

5. The method of claim 4, the control signaling including mobility management information or transfer of control information.

6. The method of claim 1, further comprising continuing, by the uWave base station, the communications with the UE in the uWave band after a failure of the communications between the mmWave base station and the UE using the mmWave beam.

7. The method of claim 6, the communications in the uWave band comprising radio resource signaling communicated after the failure of the communications between the mmWave base station and the UE using the mmWave beam.

8. The method of claim 1, wherein the mmWave beam is selected based on the non-zero power CSI-RS(s).

9. The method of claim 1, further comprising allocating, by the uWave base station, blank uWave base station transmission spaces for a proximity determination of the mmWave base station by the UE.

10. A microwave (uWave) base station comprising:
at least one processor; and
a non-transitory computer readable storage medium storing programming for execution by the at least one processor, the programming including instructions that cause the uWave base station to:
communicate with a user equipment (UE) in a uWave band;
send a request to a millimeter wave (mmWave) base station to transmit one or more non-zero power Channel State Information Reference Signal(s) (CSI-RS(s)) in the uWave band;
transmit, to the UE, a system information block (SIB) or radio resource control (RRC) message including reference signal (RS) configuration information identifying RS resources over which the non-zero power CSI-RS (s) are to be transmitted by the mmWave base station, the RS configuration information including at least one of antenna port configuration information, frequency information, code information, or power information of the RS resources for the non-zero power CSI-RS(s), the SIB or RRC message including instructions for the UE to take quality measurement(s) of the non-zero power CSI-RS(s), both the mmWave base station and the uWave base station belonging to a common cellular access network, and the SIB message including information for multiplexing a plurality of CSI-RSs from a plurality of mmWave base stations;
receive, from the UE, a measurement report in the uWave band that indicates the quality measurement(s) of the non-zero power CSI-RS(s) transmitted by the mmWave base station; and
continue communications with the UE in the uWave band for at least a time period after the mmWave base station establishes communications with the UE using a mmWave beam.

11. The uWave base station of claim 10, the SIB or RRC message further indicating that the uWave base station supports at least one of the following: a mmWave layer, a specific number of mmWave base station ports, the RS resources over which the non-zero power CSI-RS(s) are to be transmitted by the mmWave base station, or coordinates of the mmWave base station.

12. The uWave base station of claim 10, the programming further including instructions to:
determine a proximity of the UE to the mmWave base station based on the quality measurement(s) of the non-zero power CSI-RS(s) transmitted by the mmWave base station, the proximity of the UE to the mmWave base station being used to select the mmWave beam.

13. The uWave base station of claim 10, the communications in the uWave band comprising control signaling for supporting data transmissions between the UE and the mmWave base station using the mmWave beam.

14. The uWave base station of claim 13, the control signaling including mobility management information or transfer of control information.

15. The uWave base station of claim 10, the programming further including instructions to:
continue the communications with the UE in the uWave band after a failure of the communications between the mmWave base station and the UE using the mmWave beam.

16. The uWave base station of claim 10, the communications in the uWave band comprising radio resource signaling communicated after a failure of the communications between the mmWave base station and the UE using the mmWave beam.

17. The uWave base station of claim 10, wherein the mmWave beam is selected based on the non-zero power CSI-RS(s).

18. The uWave base station of claim 10, the programming further including instructions to allocate blank uWave base station transmission spaces for a proximity determination of the mmWave base station by the UE.

* * * * *